Aug. 12, 1958 H. F. GOODMAN 2,847,126
FILTERS FOR LIQUIDS
Filed April 9, 1954 3 Sheets-Sheet 2
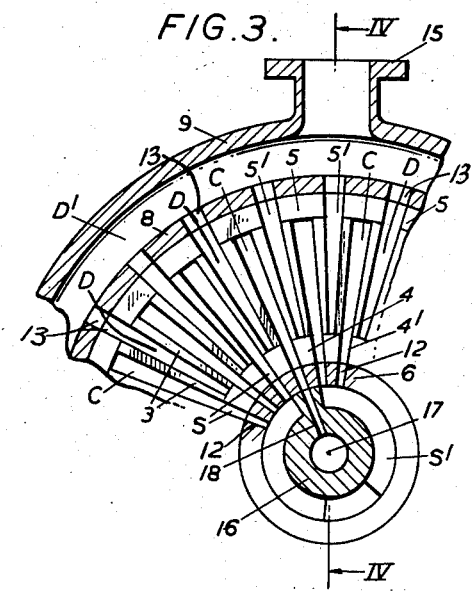
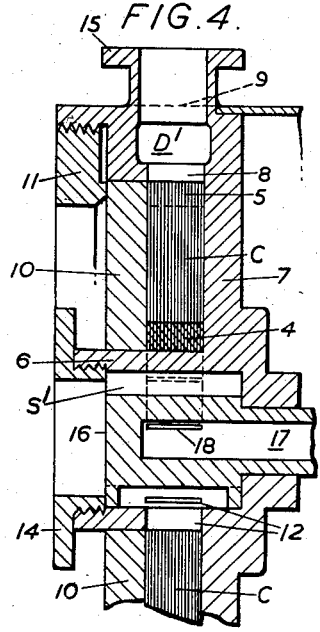
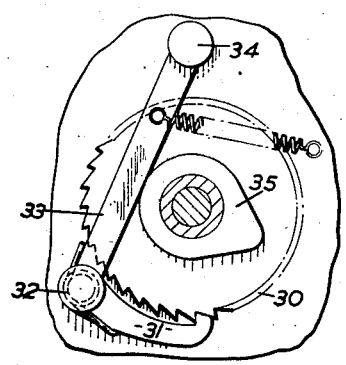
Inventor
HUGH FREDERICK GOODMAN
By
Young, Emery & Thompson
Attorneys

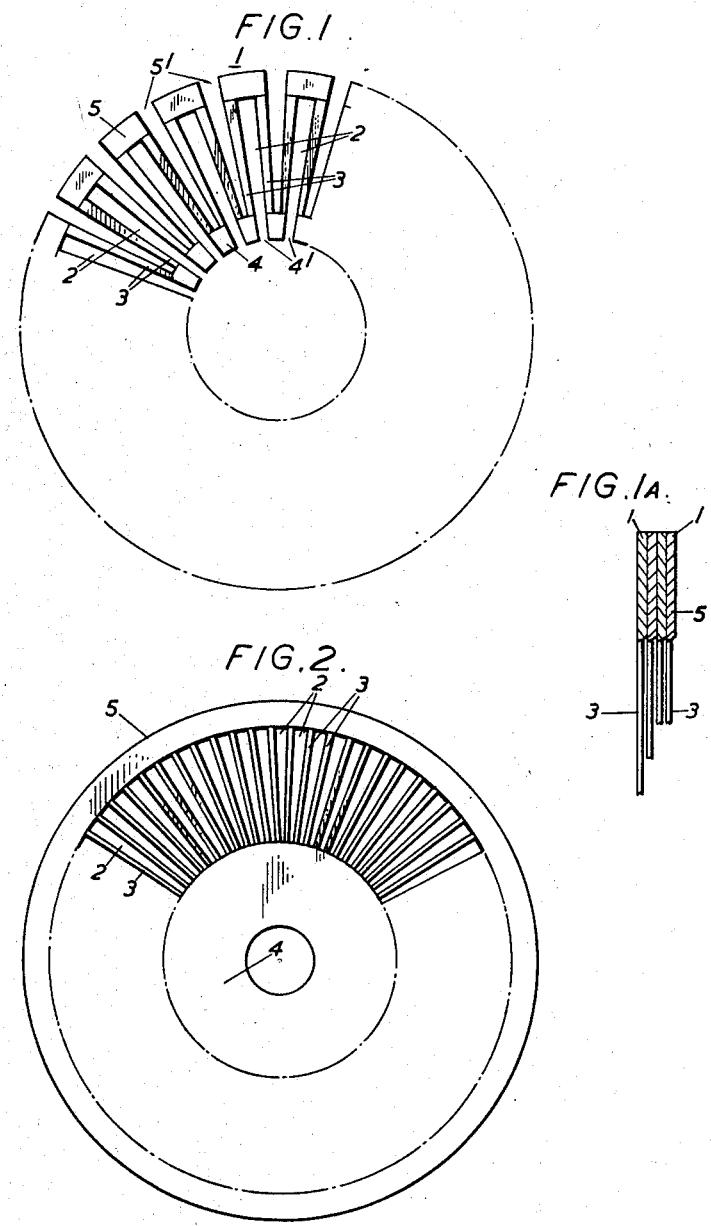

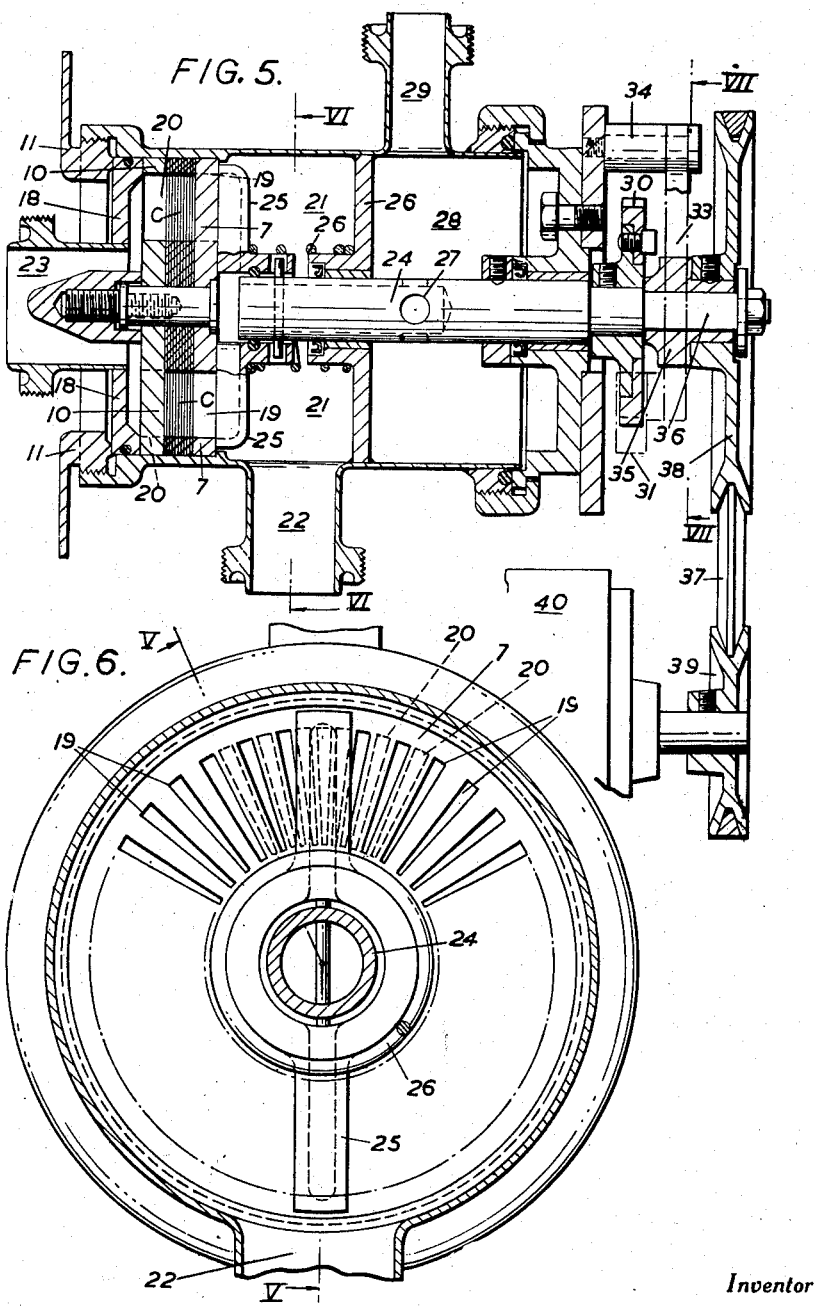

2,847,126

FILTERS FOR LIQUIDS

Hugh Frederick Goodman, London, England, assignor to The A. P. V. Company Limited Application April 9, 1954, Serial No. 422,186

11 Claims. (Cl. 210—411)

This invention relates to improvements in filters for liquids such for example as milk, beer and oil: the invention is concerned more particularly with filters of the edge type in which the liquid to be filtered is caused to flow through a small clearance between two filter elements.

The main object of this invention is to provide an edge filter construction which will provide a large filtering capacity for a given size of filter unit.

A further object of the present invention is to provide a filter of the edge type which shall be well adapted to enable the filter elements to be cleaned by the "backwash" principle.

A still further object is to provide a construction which shall be simple and well adapted for quantity production.

According to the present invention a filter comprises a number of filter elements assembled in face-to-face relationship, each element having a number of openings separated from one another by strips or fingers, and one or other (or both) of the surfaces of the elements is prepared so that when they are pressed against one another with their openings in register they leave a clearance, representing the filtering channel, between the surfaces of adjacent fingers, the registered openings of the various elements providing a series of chambers which communicate with one another through the filter clearances.

The chambers would usually be connected in alternation to a supply and a delivery for the liquid so that the liquid is compelled to flow from one chamber to the adjacent chambers through the various clearances between the fingers of the various plates.

It will be apparent that regarding any one chamber, liquid supplied thereto passes transversely each way to between the various clearances between the aligned fingers which define the chamber: the effective length of the edge filter is therefore equal to the sum of the lengths of the clearance along the two aligned sets of fingers defining the chamber and hence a considerable filter length can be provided in a small space.

It is preferred to establish the requisite clearance between the fingers by making the thickness of the fingers slightly less than the thickness of the rest of the element which latter provide abutting surfaces when the elements are pressed together on assemblage: generally one face of the fingers would be flush with one face of the rest of the element and the reduction in thickness would be formed by relieving the other face of the fingers to the required amount below the other face of the element although clearly both faces of the fingers can be relieved if required.

The elements could have any desired shape of perimeter: they could be rectangular but preferably they are of circular form, the elements constituting inner and outer rings forming the abutment surfaces with the fingers extending between the rings.

In general, the fingers would extend, in the flat ring form, radially of the inner and outer rings and in the conical form along the face of the cone although if desired other dispositions of the fingers could be used.

For the purpose of cleaning the filter by causing a back or reverse flow to take place through the clearances between the fingers, provision would be made to connect the chambers which are employed normally for the supply of liquid to a line at a pressure lower than that in the chambers normally used as the discharge side of the filter so that filtered liquid is drawn back from discharge to effect an effective cleaning action.

The invention is illustrated in the accompanying drawings in which Figs. 1, 1A and 2 are views of two forms of plate which can be employed. The form shown in Fig. 1 is intended for use in what may be termed a radial flow filter and such a filter is shown in Figs. 3 and 4 which are respectively a transverse section and a longitudinal section on the line IV—IV Fig. 3. The plate shown in Fig. 2 is intended for use in an axial flow filter and such a filter is shown in Figs. 5, 6 and 7 which are respectively a longitudinal section on the line V—V Fig. 6, an end sectional elevation on the line VI—VI Fig. 5 and a local end sectional elevation on the line VII—VII Fig. 5.

Referring firstly to Figs. 1, 1A and 2 the form of filter plate shown therein comprises a flat thin metal disc 1 having openings 2 formed in it the openings leaving fingers 3. These fingers extend radially between inner and outer ring parts 4, 5 of the disc and the thickness of the finger parts is less than the thickness of the ring parts by the required filter clearance.

If now a number of such discs are clamped together in face-to-face relationship, their ring parts 4, 5 will abut and the openings in register will provide a number of chambers which are connected one to another by the clearances formed between the fingers 3. By connecting alternate chambers to a supply and to a discharge for the liquid to be filtered the liquid will be compelled to flow from one chamber to the adjacent chambers through the clearances between the number of fingers of the plates making up the chamber. Thus the total effective filter length will consist of the sum of the lengths of the two edges of the various fingers and this length can be made considerable within a small space.

The plate shown in Fig. 1 being intended for a radial flow filter has its openings 2 extended alternately 4', 5' through the inner ring 4 and the outer ring 5 to provide for the supply and discharge of liquid to and from the chambers but in Fig. 2, intended for axial flow this extension is unnecessary, the rings 4 and 5 thus being left intact to provide annular abutting surfaces, this enabling narrower fingers 3 to be employed and hence a large number of openings 2 for a given size of plate.

Reference will now be made to Figs. 3 and 4 which show a filter incorporating the elements shown in Fig. 1. This filter comprises a fixed housing having a central tubular spigot 6 rising from a back plate 7 having flanges 8, 9 co-axial with the spigot 6, the flanges 8 and 9 defining an annular delivery chamber D' while the hollow spigot forms a central supply duct S'. The outer surface of the spigot 6 and the inner surface of the flange 8 define an annular chamber to receive the filter plates 1 which are threaded over the spigot and into the bore of the flange; these plates are clamped in position in face-to-face relationship by a pressure plate 10 which is operated by a screwed ring 11 to clamp the ring portions 4, 5 of the plates between itself and the back plate 7. When thus clamped with their openings 2 in register there are formed by the openings a number of chambers C extending parallel with the axis of the assembly the alternating chambers each having a supply passage S formed by the extension 4' and a discharge passage D formed by the extension 5'.

The spigot 6 is formed with openings 12 and the flange 8 is formed with openings 13 and the openings respectively register with the supply and discharge passages S and D so that liquid supplied to the spigot 6 passes through the openings 12, the passages S, thence to the chambers indicated at C, then to the adjacent chamber C via the filter clearances between the fingers 3, and finally through the openings 8 to the discharge annulus D'.

To enable supply and delivery connections to be made to the filter unit, the central spigot 6 is formed with a supply-connection branch 14 and the outer flange 9 is provided with a delivery branch 15.

In order to provide a back wash of the filtering elements, there is provided in the bore of the spigot 6 a reverse flow distributor 16 which can be rotated in that bore, the distributor having a central passage 17 arranged to be connected to a pressure lower than that to which the delivery through the pipe 15 is made. This distributor is formed with a branch passage 18 which by rotation of the distributor passes successively into register with the openings 12 in the spigot 6. This results in a reverse flow of the liquid, i. e. from the annulus D' through the openings 13 to the one set of chambers C, thence through the clearances to the other set of chambers C and finally through the openings 12 to the passage 17 in the distributor.

This distributor can be motor driven when required and such a drive giving an intermittent action is shown in the modified arrangement shown in Figs. 5, 7 to which reference will now be made for illustration of a filter using the filter elements shown in Figure 2 in which those parts which correspond with the construction shown in Figures 3 and 4 have similar references.

In this construction the filter elements 1 of Figure 2 are clamped between the back plate 7 and the clamping disc 10 by a thruster plate 18 pressed forward by the clamping screw-ring 11. The back plate 7 and the disc 10 are formed respectively with slots 19, 20 which register with alternate chambers C, which are themselves formed by the openings 2 in the various filter elements 1, these openings 2 being in register. The back plate 7 constitutes a wall of a supply chamber 21 having a supply pipe connection 22 while the clamping plate 18 forms a wall of a delivery chamber 23 co-axial with the axis of the disc 1. In this arrangement the liquid passes from the supply pipe 22 to the chamber 21, thence through the various openings 19 in the back plate 7 to the alternate chambers of the series of chambers C, thence via the filter clearances between the fingers 3 to the other chambers C and from them through the openings 20 in the disc 10 to the delivery chambers 23 and so to discharge. In this construction, therefore, the flow of liquid is in the axial direction.

The back-wash arrangement shown in Figures 5–7 comprises a hollow spindle 24 which passes across the supply chamber 21 and terminates in a distribution head having two arms 25 of trough cross-section the interior of the troughs being open to the hollow spindle 24 and the head being pressed by a spring 26 against the outer face of the back plate 7. The open mouth of each trough is narrow so as just to cover one of the slots 19 formed in the back plate 7.

The hollow bore of the spindle 24 is formed beyond the outer wall 26 of the chamber 21 with branch openings 27 which communicates with a back-wash chamber 28 having a pipe connection 29, extending to a pressure area lower than the delivery pressure at the delivery chamber 23. With this arrangement the same back-wash action occurs as with the arrangement shown in Figures 3 and 4, i. e. by rotating the hollow spindle 24 the trough-shaped arms 25 of the distribution head are successively brought into register with the pairs of openings 19 and hence with the chambers C registered to those openings so that a reverse axial flow takes place, i. e. from the normal delivery 23 through the openings 20 to alternate chambers C and then via the clearances between the fingers 3 to the other chambers C and from there through the openings 19 aligned with the arms 25 and the hollow spindle 24 to the back-flow chamber 28 and thence to the back-flow discharge pipe 29.

In order to effect an intermittent movement of the distributor head to carry the arms 25 from one pair of openings 19 to the next pair, the head resting between each movement so as to remain in register with the openings 19 for a short back-wash period, the hollow spindle 24 is extended through the outer wall of the back-wash discharge chamber 28 and is fitted with a ratchet wheel 30 engaged by a spring-loaded pawl 31 pivoted at 32 on an arm 33 pivoted at 34. This arm 33 engages a cam 35 rotatable on a stub extension 36 of the spindle 24.

The cam 35 can be connected direct to the spindle of an electric motor or it can as shown be driven by a belt 37 passing over a pulley 38 fast with the cam and over a pulley 39 on the spindle of the motor shown at 40.

When a back-wash operation is required the motor 40 is switched on and the cam 35 causes the arm 33 to be rocked: in one stroke of the arm the pawl 31 advances the ratchet wheel by a fixed amount which is selected to move the arms 25 of the distribution head from one pair of openings 19 to the next: in its reverse stroke the pawl slips past the teeth of the ratchet wheel so leaving the distributor head at rest to perform the back-washing operation through the openings and chambers C with which its arms 25 are in register at that time.

Obviously the distributor head can have only one arm 25 or more than two arms 25 as are shown, the arms (when two or more are used) having an angular separation related to the angular separation of the openings 19 in the back-plate 7.

What I claim is:

1. A filter comprising a stack of filter elements formed of thin metal and each having radial finger parts of a length substantially greater than their width and inner and outer circular boundary parts of greater thickness than the finger parts, which finger parts extend lengthwise between said boundary parts, the elements being arranged in the stack with their finger parts in alignment so that the openings between adjacent finger parts provide radially disposed inflow and outflow chambers, the boundary parts also being aligned so as to support corresponding finger parts of adjacent elements in spaced relationship to provide filter clearances through which fluid flow can take place from one chamber to another in the direction of the width of the finger parts.

2. A filter as claimed in claim 1 and intended for a radial flow of the liquid to be filtered and wherein certain of the openings are extended through the outer boundary portion to connect the corresponding chambers to a delivery annulus about the elements, the remainder of the openings extending through a central boundary portion to connect the corresponding chambers to a central supply space for the liquid to be filtered.

3. A filter as claimed in claim 2 and wherein the elements have their circular peripheries housed between inner and outer rings having openings in register with the extensions of the openings.

4. A filter as claimed in claim 1, and intended for an axial flow of the liquid to be filtered and wherein the elements are disposed between end components having respectively supply openings in register with certain of the passages formed by the openings in the filter elements and discharge openings in register with other of the passages.

5. A filter as set forth in claim 1, including a back plate and a clamping disc for holding the filter elements tightly together, said plate and disc having slots which register with the alternate inflow and outflow chambers; said back plate constituting a wall of a supply chamber provided with a supply pipe while the clamping plate forms a wall of a delivery chamber coaxial with the axis of the filter elements.

6. A filter comprising a number of filter elements formed of thin metal and each having finger parts extending between aligned boundary parts of greater thickness than the finger parts, and the elements having each a series of openings which are in register to provide through the series of elements inflow and outflow passages which communicate through the filter clearances provided by the smaller thickness of the finger parts, the filter comprising also means to apply clamping pressure to the boundary parts of the elements and a back-wash component having associated with it means to advance it into register with the said inflow passages.

7. A filter comprising a number of layers of thin metal each layer having a number of radial finger-parts extending between inner and outer circular boundary parts of increased thickness with the boundary parts of the various layers presented to one another so to afford support for the finger parts at their two ends, the layers being formed to provide a number of radially disposed inflow and outflow passages connected with one another by the filter clearances formed by the reduced thickness of the finger parts with an adjacent layer, and a backwash component which is supported for angular movement about the axis of the boundary parts of the layers, the said component being associated with means to advance it into register with certain of the said passages in succession.

8. A filter comprising a stack of filter elements formed of thin metal and each having finger parts of a length substantially greater than their width, and boundary parts of greater thickness than the finger parts, a number of which extend lengthwise between said boundary parts, the elements being arranged in the stack with their finger parts in alignment so that chambers through the stack are provided by the gaps between the finger parts of each element, the boundary parts also being aligned so as to support corresponding finger parts of adjacent elements in spaced relationship to provide filter clearances through which fluid flow can take place from one chamber to another in the direction of the width of the finger parts, and means for applying clamping pressure to the boundary parts of the plates.

9. A filter comprising a stack of aligned filter discs formed of thin metal and each having inner and outer circular boundary parts and radial finger parts of a reduced thickness relative to the boundary parts, each finger part having a length which is a plurality of times greater than its width and an inner end supported by the inner boundary part and an outer end supported by the outer boundary part, the arrangement being such that inflow and outflow chambers extending through the stack of discs are provided by the radially disposed spaces between the finger parts of each disc, and the inflow chambers are connected with the outflow chambers by the filter clearances between the corresponding finger parts of adjacent discs, the filter comprising also means to apply clamping pressure to the boundary parts of the discs.

10. A filter comprising a stack of filter elements formed of thin metal and each having radial finger parts of a length substantially greater than their width and inner and outer circular boundary parts of greater thickness than the finger parts, which finger parts extend lengthwise between said boundary parts, the elements being arranged in the stack with their finger parts in alignment so that the openings between adjacent finger parts provide radially disposed inflow and outflow chambers, which chambers are alternately open to a source of supply of liquid to be filtered and a delivery for filtered liquid, the boundary parts of the filter elements also being aligned so as to support corresponding finger parts of adjacent elements in spaced relationship to provide filter clearances through which liquid can flow between adjacent chambers.

11. A filter intended for a radial flow of the liquid to be filtered and comprising a number of layers of thin metal, each layer having a number of radial finger parts extending between inner and outer circular boundary parts of increased thickness with the boundary parts of the various layers presented to one another so as to afford support for the finger parts at their two ends, the layers being formed with openings to provide a number of radially disposed inflow and outflow chambers connected with one another by the filter clearances formed by the reduced thickness of the finger parts with an adjacent layer, certain of the openings extending through the outer boundary part to connect the corresponding chambers to a delivery annulus about the elements, the remainder of the openings extending through the inner boundary part to connect the corresponding chambers to a central supply space for the liquid to be filtered, the filter also comprising inner and outer rings between which the elements are housed, said inner and outer rings having apertures in register with the extensions of the openings.

References Cited in the file of this patent

UNITED STATES PATENTS

| | | |
|---|---|---|
| Re. 19,359 | Armstrong | Nov. 6, 1934 |
| 990,861 | Hamill | May 2, 1911 |
| 1,547,955 | Price | July 28, 1925 |
| 1,758,284 | Gronning | May 13, 1930 |
| 1,768,350 | Chase | June 24, 1930 |
| 1,773,797 | Hele-shaw | Aug. 26, 1930 |
| 1,849,042 | Pickard | Mar. 8, 1932 |
| 2,063,742 | Holmes | Dec. 8, 1936 |
| 2,066,479 | MacIsaac | Jan. 5, 1937 |
| 2,167,322 | Cuno et al. | July 25, 1939 |
| 2,339,703 | Kamrath | Jan. 18, 1944 |
| 2,687,805 | Proulx | Aug. 31, 1954 |

FOREIGN PATENTS

| | | |
|---|---|---|
| 9,228 | Great Britain | Apr. 13, 1911 |
| 107,090 | Great Britain | June 2, 1917 |
| 486,397 | Great Britain | June 2, 1938 |
| 665,149 | Great Britain | Jan. 16, 1952 |
| 467,402 | Canada | Aug. 15, 1950 |